Aug. 5, 1941.   H. G. BEEDE   2,251,390
MEANS FOR MOUNTING BOBBINS ON SPINDLES TO DAMPEN THE VIBRATION THEREOF
Filed March 10, 1939   2 Sheets-Sheet 2
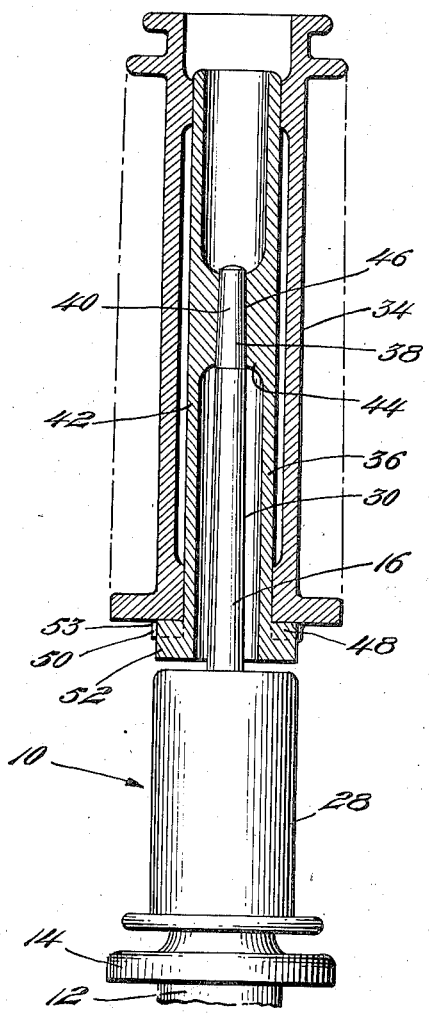
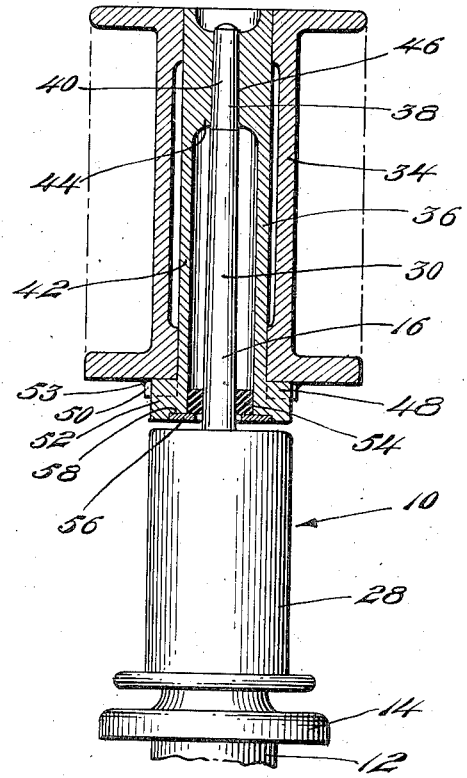
Inventor
Herbert G. Beede
By Thomas A. Jenckes
Attorney Patented Aug. 5, 1941

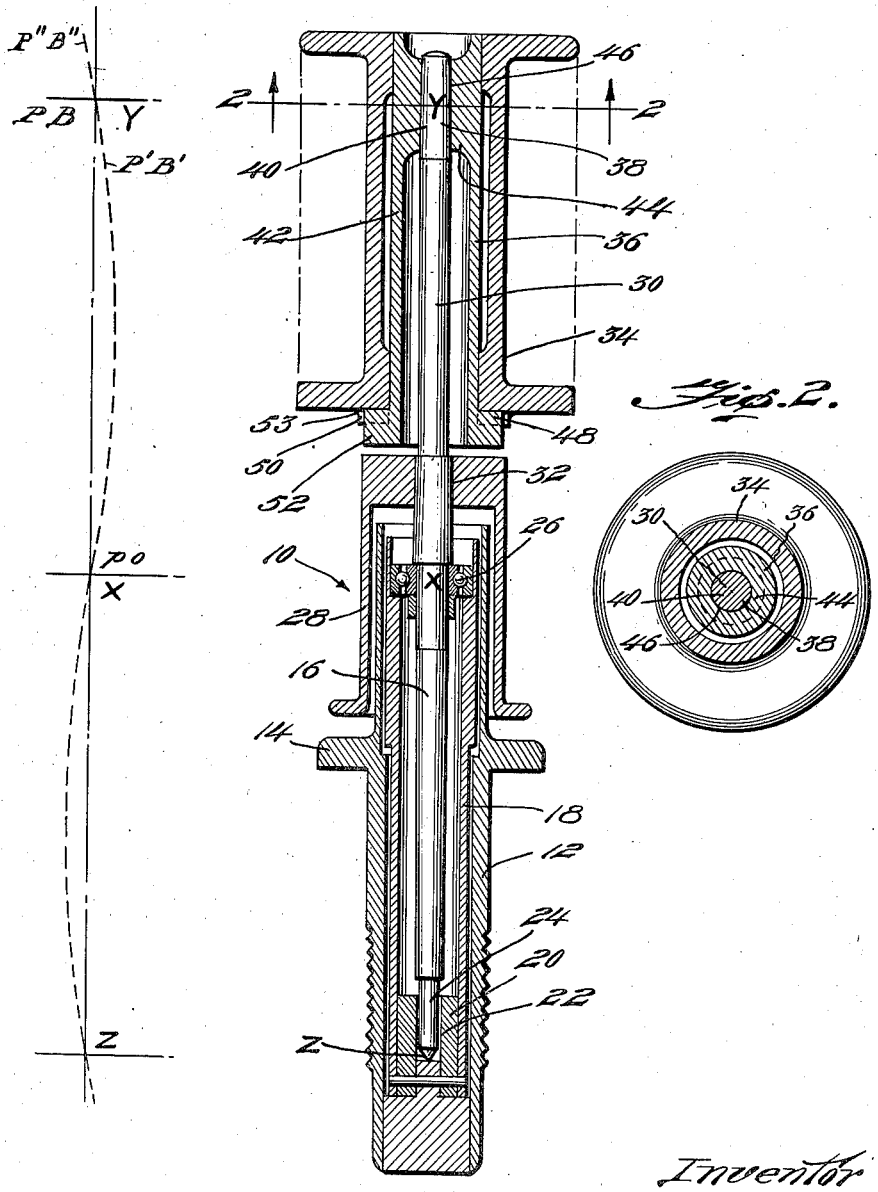

2,251,390

UNITED STATES PATENT OFFICE 2,251,390

MEANS FOR MOUNTING BOBBINS ON SPINDLES TO DAMPEN THE VIBRATION THEREOF

Herbert G. Beede, Pawtucket, R. I.

Application March 10, 1939, Serial No. 260,970

5 Claims. (Cl. 308—169)

My invention relates to means for mounting a bobbin on a spindle blade for dampening the vibration or distortion thereof.

In the spinning or twisting of textile strands, even with the most carefully balanced spindle blades and bobbins, it has been found in practice that various sets of harmonic or non-harmonic vibrations occur. These have been caused by irregularities in the spindle blade, irregularities in the construction of the bobbin itself and former methods of mounting the bobbin on the spindle blade and irregularities in the winding of the yarn or thread onto or from the bobbin. In small sized bobbins and spindles as used in the past, the well known methods of constructing the spindles with loose bolsters and flexible mountings have largely compensated for these vibrations.

With the growing use of large size bobbins and high rate of spindle blade rotation, these vibrations have become more noticeable, particularly at certain critical speeds. I have observed in my experience in designing such high speed spindle blades to carry large bobbins, that one major critical vibration or distortion takes place for certain types of spindle blades and bobbins at between 1300–2000 R. P. M., another major critical or distortion at approximately 3000–4000 R. P. M. and a third major critical or distortion at between 7200–8000 R. P. M. This subject is further discussed in "Mechanical Vibrations," J. P. Dern Hartog, (1st ed.) McGraw-Hill Book Co., Inc., New York and London, 1934, pps 237–280 and in "Vibration Prevention in Enginnering," Arthur L. Kimball, John Wiley & Sons, New York, 1932. This third critical is a noticeably violent critical in which the spindle blade apparently attempts to adjust itself to a new running axis, and I have found that in so doing it tends to vibrate or distort excessively between the ends and center of gravity thereof. I have also discovered that if a bobbin is mounted on a spindle blade at substantially an equal distance above the axis of oscillation thereof to the distance that said axis of oscillation is above the lower end of the spindle blade, that a more perfectly balanced spindle blade may be provided which will not vibrate or distort so severely at this particular critical speed and at other speeds as well. In former designs, the bobbins have been mounted on the spindle blades at such random points as to cause unbalanced spindle blades in operation. By visualizing the cause of this excessive vibration or distortion and by so mounting the bobbin on the spindle blade in the manner aforesaid, I am enabled to substantially lessen the effect of this critical distortion or vibration, and other vibrations in high speed spindle blades particularly when large bobbins are used.

These and such other objects of my invention as may hereinafter appear will be best understood from a description of the accompanying drawings, which illustrate various embodiments thereof.

In the drawings,

Fig. 1 is a vertical sectional view taken through a spindle constructed in accordance with my invention and employing a relatively short bobbin.

Fig. 2 is a horizontal sectional view taken along the line 2—2 of Fig. 1.

Fig. 3 is a diagrammatic view substantially plotting the shape and curve of distortion of such a spindle blade when passing through the above-mentioned third critical.

Fig. 4 is a vertical sectional view of the upper portion of a modified form of spindle and attached bobbin constructed in accordance with my invention showing the whirl in elevation and with the lower portion of the bolster case removed.

Fig. 5 is a vertical sectional view similar to Fig. 3 of the embodiment of my invention shown in Fig. 1 and employing a resilient annular member interposed between the lower end of the bobbin carrier sleeve and spindle blade to limit excessive oscillation of the bobbin when passing through any of said criticals.

In the drawings, wherein like characters of reference indicate like parts throughout, 10 generally indicates a spindle constructed in accordance with my invention. Said spindle includes a case 12, which may be a standard type of bolster case having a suitable annular flange 14 for mounting it on the spindle frame. A spindle blade 16 extends substantially vertically and substantially centrally of the case 12. Means are provided for mounting said spindle blade 16 within said case 12 to provide a point of oscillation therefor between the top and bottom ends thereof, preferably substantially centrally thereof.

Any of the well-known types of means for this purpose may be provided and I have illustrated a standard well-known type, of the general type shown in my former Patent No. 1,511,257 which includes a standard bolster 18 loosely mounted within the bolster case 12 and having a step bearing 20 in the lower end thereof having a central hole 22 for loosely mounting the lower end 24 of the spindle blade 16 therein. In most instances, the spindle blade is preferably loosely mounted within said casing and bolster if employed and said means for mounting said blade within said casing preferably includes a flexible upper bearing near the upper end of the bolster case. I employ the clause "flexible upper bearing" to signify a bearing of such a height and length axially of the bearing that the lower end of the spindle blade may oscillate within the case to provide a point of oscillation for the spindle blade between the top and bottom ends thereof to distinguish from the rigid upper bearings of the prior art. Referring to the drawings, it is obvious that the central hole in the bearing through which the spindle blade passes, substantially at the point X as shown in Fig. 3, must be of a size to permit free oscillation of the spindle blade therein without causing a binding at opposite sides of the top and bottom thereof. In accordance with the teachings of said patent, I preferably employ a ball bearing 26 as the upper bearing, located substantially at the top of said bolster case 12, which as shown in said patent, is mounted within the upper end of said bolster 18, it being obvious, however, that if desired, any other suitable form of flexible upper bearing 26 suitably mounted within the case may be employed for this purpose. Where a ball bearing 26 is employed as said upper bearing the point of oscillation of said spindle blade is located substantially centrally of said ball bearing. If a plain bearing be employed at this point, I have found that the point of oscillation may be slightly higher. Said spindle also includes the usual whirl 28 and the spindle blade 16 extends upwardly as at 30 beyond the point of attachment 32 of said whirl 28 to said blade and has the usual bobbin 34 and bobbin carrier sleeve 36 when employed mounted on the upper end 38 thereof.

As stated hitherto, high speed spindle blades, particularly when carrying large bobbins, rotating at a relatively higher speed than formerly, when passing through the before mentioned third critical become distorted in the manner diagrammatically illustrated by the curve in Fig. 3, which distortion can actually be observed in practice. Between the top point Y of the spindle blade and the bottom point Z thereof, if the point of oscillation P. O. of the spindle blade be at the center of gravity X of the spindle blade YZ, said spindle blade will be distorted in one direction between the lower end Z and center of gravity X and between said center point X and upper end Y distorted substantially equally in the diametrically opposite direction. With a spindle blade such as shown, substantially evenly balanced throughout the height thereof, it is obvious that the center of gravity will be substantially as shown at the center point X of the height thereof. If, however, the spindle blade be unevenly balanced, it is apparent that its point of oscillation P. O. will vary in proportion from the center point X thereof. I employ the phrase "evenly balanced" as referring to a spindle blade of substantially uniform weight and diameter or of evenly balanced weight and diameter above and below its center point. This distortion will take place in the spindle blade regardless of where its point of oscillation be located, but if, as will be apparent from the drawing, the point of oscillation P. O. be located substantially at the center of gravity thereof, with an evenly balanced spindle blade as shown centrally thereof, it will be distorted in the manner shown to lie substantially in the axis of rotation of the spindle blade when passing through this critical. I have discovered that if the point P. B. at which the bobbin is mounted on the spindle blade, be at the point Y, which according to the curve is the distance X—Y substantially equal to the distance X—Z between the lower end of the spindle blade and its center X, that the point P. B. will also be located substantially in the axis of rotation of the spindle blade when passing through this critical. As will be apparent from the curve, if the point of mounting the bobbin on the spindle blade be located at P.' B.' below or P." B." above the point Y, or at a point where the distance P. B.—X does not substantially equal the distance X—Z, it is apparent that the axis of the bobbin will then be mounted at an oblique tilt when passing through said critical on an axis spaced from the axis of rotation of the spindle blade, corresponding to the curve. This would also tend to exaggerate the vibration of the bobbin and increase the amount of the critical. It is also apparent that if the point P. B. be located at the point Y, that the axis of the rotating bobbin will substantially coincide with the axis of rotation of the spindle blade and thus resist any tendency of the spindle blade to jump or vibrate or distort and thus distort the rotation of the bobbin. This provides a gyroscopic or balance wheel effect in the bobbin to tend to resist distortion of the spindle blade and maintain it in a vertical line, when passing through this critical substantially performing the function of a third bearing located at a third nodal point Y, the other nodal points being substantially the points X and Z. It is apparent, however, that if a spindle blade of uneven diameter throughout the height thereof or one of uneven balance or weight above or below its center point be employed that the distance P. B.—P. O. will not always be equal to the distance Z—P. O. and that such distances Z—P. O. and P. B.—P. O. will vary in proportion to such variation in diameter from the distances X—Z and X—Y and I employ the word "distance" in the claims to include such variation. In practice, however, it has been customary to make spindle blades substantially of balanced diameter and weight throughout the height thereof so that employing my invention thereon the distance P. B.—P. O. should be substantially equal to the distance P. O.—Z. While, as stated, my invention is particularly adapted to resist the vibration or distortion at this particular critical, it is obvious that my improved construction tends to provide a smooth running bobbin at all speeds and on all types of spindles.

While any means may be provided to mount the bobbin and thus provide the theoretical point P. B. of the bobbin 34, on the upper end 38 of the spindle blade 16, I have shown a construction in the drawings, which I have found particularly suitable for this purpose. The upper end 38 of the spindle blade is provided with a frusto-conical head 40 and a bobbin carrier sleeve 42 is provided having an annular web 44 of substantial axial length having a cooperating axial frusto-conical bore 46 therein to compactly receive the frusto-conical spindle blade head 40 for mounting of the bobbin carrier sleeve on said spindle blade. The bobbin 34 may then be suitably non-rotatably mounted on the bobbin carrier sleeve 36 in any suitable manner by friction, or otherwise, in the embodiment shown, by having a diametric spline 48 projecting axially upwardly from an annular flange 52 on the lower end of the bobbin carrier sleeve fitting into a cooperating axial diametric groove 50 in a boss 53 depending axially from the lower end of the bobbin 34. I have illustrated in Fig. 1 a relatively short bobbin 34. In this embodiment, the web 44, with its cooperating axial frusto-conical bore 46 is located near the upper end of the bobbin carrier sleeve 36 to provide the point of mounting P. B. of the bobbin on the spindle blade near the top of said bobbin carrier sleeve. I have shown in Fig. 4, my invention applied to a higher bobbin of longer traverse, in which case the web 44 may be located substantially centrally of the bobbin carrier sleeve 36 so that the point P. B. of the mounting of the bobbin on the spindle blade is substantially central of the bobbin carrier sleeve. It is obvious, however, that the position of the point P. B. on the bobbin carrier sleeve may vary in accordance with the height and traverse of the bobbin desired to be employed, two extreme variations thereof having been shown in Figs. 1 and 4.

I may also, if desired, provide resilient annular means 54 interposed between the lower end of said bobbin and spindle blade to limit excessive oscillation of the bobbin, in the embodiment shown being located between the lower end of the bobbin carrier sleeve and adjacent portion of the spindle blade, it being obvious by reference to diagrammatic Fig. 3 that at this point the curve X—Y is quite substantial and that such resilient means 54 tends to cushion the vibration of the bobbin. In the embodiment shown, said means 54 preferably comprises a resilient ring member 54 constructed of resilient material, such as rubber or resilient composition and said resilient ring member may be secured in position by means of the washer 56 countersunk as at 58 within the lower end of said bobbin carrier sleeve 36. It is apparent, however, that the ring member 54 may be constructed of any suitable resilient material and may be suitably secured in any desired manner in any proper position. While I have shown the separate bobbin carrier sleeve 36, it is obvious that if desired, the web 44 and its bore 46 may be constructed integrally with the bobbin, particularly if the bobbin be molded of suitable plastic material.

It is apparent that I have provided a novel type of spindle and means for mounting the bobbin thereon, which is particularly resistant to the critical vibration between 7200–8000 R. P. M. and I have provided a desirable construction for functioning at all speeds with the advantages explained above.

It is understood that my invention is not limited to the specific embodiments shown and that various deviations may be made therefrom without departing from the spirit and scope of the appended claims.

What I claim is:

1. A spindle comprising, in combination, a case, a spindle blade extending substantially vertically and substantially centrally of said case, means including an upper bearing for flexibly mounting said spindle blade within the case to provide a point of oscillation therefor between the top and bottom ends thereof, and means to support a bobbin on said spindle blade only at a portion thereof at a distance above said point of oscillation substantially equal in distance to the distance that said lower end of said spindle blade is below said point of oscillation.

2. A spindle, comprising, in combination, a case, a spindle blade extending substantially vertically and substantially centrally of said case, means including an upper bearing at the mid-nodal portion of the spindle blade for flexibly mounting said spindle blade within the case to provide a point of oscillation therefor in said mid-nodal portion between the top and bottom ends of said spindle blade and a bearing at the lower nodal portion adjacent the lower end of said spindle, and means to support a bobbin on said spindle blade only on the upper nodal portion thereof, all said nodal portions being substantially in the axis of rotation of the spindle blade when passing through the characteristic distortion of its third critical.

3. A spindle, comprising, in combination, a case, a spindle blade extending substantially vertically and substantially centrally of said case, means including an upper ball bearing substantially at the mid-nodal portion thereof flexibly mounting said spindle blade within the case to provide a point of oscillation therefor in said mid-nodal portion between the top and bottom ends thereof, and a bearing in the lower nodal portion adjacent the lower end of said spindle, and means to support a bobbin on said spindle blade only on the upper nodal portion thereof, all said nodal portions being substantially in the axis of rotation of the spindle blade when passing through the characteristic distortion of its third critical.

4. A spindle, comprising, in combination, a case, a spindle blade extending substantially vertically and substantially centrally of said case, means including an upper bearing substantially at the mid-nodal portion thereof flexibly mounting said spindle blade within the case to provide a point of oscillation therefor in said mid-nodal portion between the top and bottom ends thereof, and a bearing in the lower nodal portion adjacent the lower end of said spindle, and means to support a bobbin carrier sleeve on said spindle blade only on the upper nodal portion thereof, all said nodal portions being substantially in the axis of rotation of the spindle blade when passing through the characteristic distortion of its third critical.

5. A spindle, comprising, in combination, a case, a spindle blade extending substantially vertically and substantially centrally of said case, means including an upper bearing substantially at the mid-nodal portion thereof flexibly mounting said spindle blade within the case to provide a point of oscillation therefor in said mid-nodal portion between the top and bottom ends thereof, and a bearing in the lower nodal portion adjacent the lower end of said spindle, and means to support a bobbin on said spindle blade only on the upper nodal portion thereof, all said nodal portions being substantially in the axis of rotation of the spindle blade when passing through the characteristic distortion of its third critical and resilient annular means interposed between the oscillatable lower end of said bobbin and said spindle blade to limit excessive oscillation of the bobbin.

HERBERT G. BEEDE.